United States Patent [19]

Kingsley et al.

[11] Patent Number: 5,316,751
[45] Date of Patent: May 31, 1994

[54] METHODS FOR MINE TAILING CLEAN-UP USING RECOVERY TECHNOLOGIES

[76] Inventors: Gordon Kingsley, 10 Bonnie Pl., Pleasant Hill, Calif. 94523; Richard E. Peterson, 537 Valley St., San Francisco, Calif. 94131

[21] Appl. No.: 652,568

[22] Filed: Feb. 11, 1991

[51] Int. Cl.$^5$ ............................................. C01G 1/12
[52] U.S. Cl. .................................. 423/571; 423/36; 423/95; 423/106; 423/578.1; 423/578.2; 44/622; 44/624; 435/262.5
[58] Field of Search ............... 423/106, 36, 41, 95, 423/578 R, 578 A, 576.6, 576.2, 571; 44/622, 624; 435/282, 822, 262.5

[56] References Cited

U.S. PATENT DOCUMENTS

| | | | |
|---|---|---|---|
| Re. 32,454 | 7/1987 | Starbuck | 106/286.8 |
| 3,927,170 | 12/1975 | Dixon et al. | 423/571 |
| 4,038,361 | 7/1977 | Posel | 423/571 |
| 4,177,067 | 12/1979 | Pepper et al. | 423/571 |
| 4,192,851 | 3/1980 | Hirsch et al. | 423/571 |
| 4,256,485 | 3/1981 | Richardson | 44/624 |
| 4,269,699 | 5/1981 | McCready et al. | 44/624 |
| 4,456,688 | 6/1984 | Dugan et al. | 44/624 |
| 4,760,027 | 7/1988 | Sublette | 435/266 |
| 4,784,838 | 11/1988 | Paul et al. | 423/266 |
| 4,859,588 | 8/1989 | Sublette | 435/68 |
| 4,923,482 | 5/1990 | Menar | 23/308 |

OTHER PUBLICATIONS

C. L. Brierley, "Microbiological Mining," *Scientific American*, Aug. 1982, pp. 44–53.

Z. S. Altschuler, M. M. Schnepfe, C. C. Silber, F. O. Simon, "Sulfur Diagenesis in Everglades Peat and Origin of Pyrite in Coal," *Science*, vol. 221 #4607 p. 221 Jul. 15, 1983.

J. R. Postgate, "Recent Advances in the Study of the Sulfact-Reducing Bacteria," *Bacteriology Review*, vol. 29, 425 (1965) (no month available).

Hawley, *Condensed Chemical Dictionary*, Van Nostrand Reinhold, 1974, p. 364.

*Primary Examiner*—David Brunsman
*Attorney, Agent, or Firm*—Bielen, Peterson & Lampe

[57] ABSTRACT

A method for site remediation for mitigating contamination from metals or metal compounds, particularly resulting from the situation of mine tailing waste on or near water sources, including the reprocessing and redeposit of separated sands and slimes in-site in a manner to encourage rather than inhibit leaching of residuals by chelating agents or biological agents with recovery of leachate and removal of metals or metal compounds.

23 Claims, 6 Drawing Sheets

METHODS FOR MINE TAILING CLEAN-UP USING RECOVERY TECHNOLOGIES

BACKGROUND OF THE INVENTION

This invention relates to methods of site remediation for mitigating contamination from metals or metal compounds, particularly resulting from the situation of mine tailing waste on or near water sources such as streams or underground aquifers.

In the mining industry milling of mined rock is frequently done proximate to water supplies, since typically large quantities of water are used in the milling process to develop a suitable concentrate for refining operations. Mills are often centrally located to receive ores from a variety of different mine sources such that the composition of discarded material is often complex, having a variety of different potential contaminants. During the milling operation, ore is customarily crushed to a fine consistency, such that discarded tailings include primarily fine sands and slimes. Slimes are generally characterized as material of a particle size that remains suspended in water for a period of time and are usually less than 200 mesh in screen size.

Ore dressing circuits that were designed to obtain a concentrate have historically used water as a carrier medium for classification of material according to size or separation of material according to specific gravity. After separation to recover a majority of the valves from the remaining gangue, the gangue is discharged in tailing dumps either as a slurry or in a wet cake condition.

Since all are dressing circuits ore unable to recover one hundred percent of the target values from an ore, remnants of the target values remain in discarded tailings in concentrations of marginal economic value, particularly when using conventional recovery methods. In addition to target values, the tailing generally include minerals that were not originally targeted for recovery, but which pose hazards to water sources. Such minerals, frequently in the form of metal sulfides oxidize to water soluable sulfates on exposure to the elements including air, rain and underground seepage.

Current remediation techniques are usually directed to isolation of such tailing dumps, using impervious covers or caps to prevent influx of rain and to inhibit blow of fines. Containment may include underlying impervious base pads to isolate the dumps from ground water. Other similar techniques offer temporary solutions that do not resolve the potential problem, and are not truly remedial over the long run. Furthermore, such containment techniques take the site out of use and unnecessarily establish graveyards with all but minimal surface use excluded. Finally, such containment structures do not insure that avenues for escape of contaminants into the proximate water sources do not in fact occur. Eventually, contamination is inevitable and subsequent remediation costs are compounded by the containment structures put in place.

SUMMARY OF THE INVENTION

The methods here proposed are based on the principle of designing remediation projects that are in tune with nature such that over time, monitoring and attendance to active systems diminishes. The methods are particularly applicable to complex sulfide tailings including mixed sulfides of lead, zinc, copper, silver and iron.

Initially, a site study is performed to identify all vectors of contamination. By identifying and quantifying the pathways of contamination, steps to halt, redirect and channel contaminants can be implemented. Additionally, local biospheres are to be identified, preserved and sampled for reintroduction into rehabilitated grounds or incorporation into active biological remediation systems because of their demonstrated adaptation to usually harsh existing conditions at the site under remediation.

Intermediately, a plan is devised for either in situ reprocessing of tailings or alternately entrained reprocessing of the tailings by on or off-site equipment. If entrained reprocessing is selected, the reprocessed tailings are redeposited in a condition and in a manner that will enhance the long term remediation process.

Finally, a hydrological circuit is developed in coordination with a contoured land topology that will enhance soil leaching by imposed and natural means and that will conform to the ultimate planned use of the site, be it commercial property, a groomed golf course, or a natural habitat.

At the same time that the ultimate deposition of the land is planned, the remediation methods devised are designed to maximize the recovery of values from the tailings to at least defray some of the expenses of remediation.

A primary object of these methods is the extraction of market grade products such as concentrates of metals and metal compounds, or refined metals and minerals, particularly elemental sulfur. Such recovery thereby removes metal sulfides and leachable sulfate salts which are the primary cause of continuing residual contamination of complex sulfide ore tailings sites. Elemental sulfur is preferably extractable by proprietary processes, one described in detail in the Starbuck, U.S. Pat. No. Re 32,454, reissued Jul. 7, 1987 for Process for Desulfurization of Coal and Ores.

Reclamation and expansion of existing waterways and wetlands and ultimate utilization of the reclaimed site for commercial enterprise or pastoral enjoyment are prime ultimate objectives. Mutual protection of human health and the environment is generally achieved by a three point approach to site remediation comprising purification, neutralization, vitrification and cementation.

Purification is directed to the refining and removal of economically recoverable minerals and metals from the site tailings. This is primarily accomplished by mechanical and chemical processes as augmented by biological recovery systems during long term remediation. Marketable minerals and metals are commonly sulfur, zinc, lead, silver, gold, copper and iron.

Neutralization is directed to neutralizing the chemical acids and by-products during chemical processing, and recovering or rendering inert isolated toxins such as cadmium, arsenic or lead that often cannot be recovered in marketable form or quantities. Additionally, recovery of chelated minerals having value as micronutrient fertilizer blends is available in the neutralization process.

Cementation will be directed at the formulation of different binders primarily from on-site processed materials for the production of conventional lime based cements, fibre impregnated cements, sulfur based cements and geopolymer cements, and, the use of such binders in the fabrication of on-site refining, reclamation and containment structures and saleable off-site building products, including cultured stone, tiles and precast structural materials. Reprocessed tailings can be used as composition fill material or classified and refined for use in glass or other vitrified products.

With such materials, an extensive on-site infrastructure can be developed at minimal cost. Structures can be constructed using on-site substances in component modules for pads, block and conduit. These modules can be used to erect structures useful in the storaging or processing of tailings or their products. When no longer needed for processing, the erected structures can be left in place or disassembled and used for other purposes.

Key to achieving these objectives is containment. The containment proposed, however, is not static as is the objective in conventional capping technology, but dynamic. From the time of initiation of reprocessing operations mitigation steps are to be implemented that work with the natural environment and peculiar geological and geographical conditions at the site to reduce contamination and improve the overall site ecology. Even in the physical sense, containment is accomplished by use of material intensive structures utilizing on-site materials with a landscape and flora design that quantitatively reduces soil contaminants as time passes and prevents escape of contaminants to off-site lands and waters.

The alternative reprocessing circuits here propose are in part based on assumptions made in reliance on data in that typifies complex sulfide ore of the type encountered from zinc and lead refining industries. The tailings from these industries in particular contain substances that pose hazards for adjacent waters and lands.

Additionally, the alternative methods introduce new leach processes for complex ores. These and other features of the invention will become apparent on a detailed description of the preferred embodiments described.

DETAILED DESCRIPTION OF THE PREFERRED EMBODIMENTS

Figure 1:
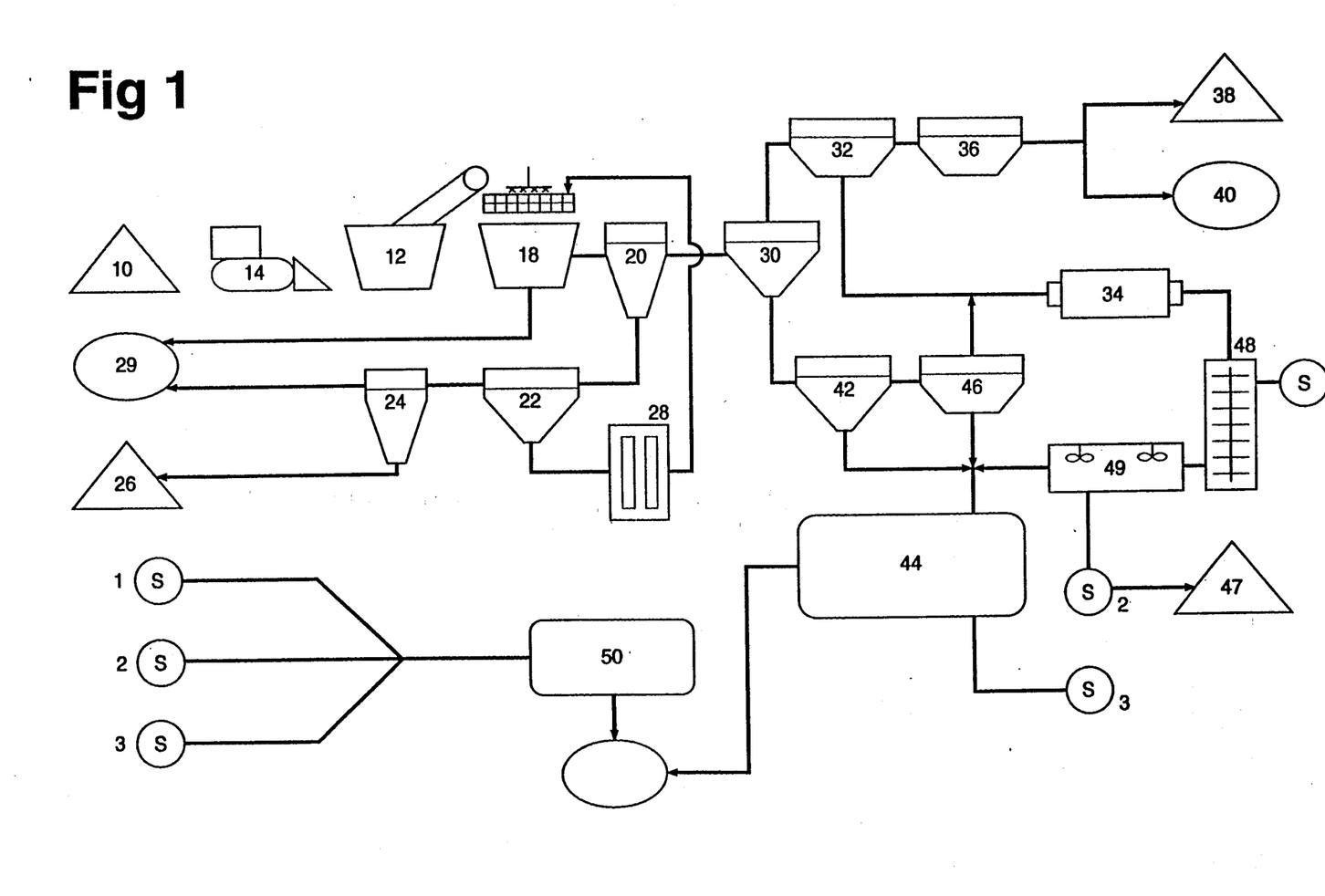
FIG. 1 is a schematic diagram of a metal sulfide tailing reprocessing circuit.

Referring now to the process flow diagram of FIG. 1, the overall process circuit is shown in simplified form. The preferred ore dressing section is founded on assumptions derived from tailing compositions set forth in an exemplar lead-zinc milling site at Midvale, Utah. It is assumed that the majority of values lies in the minus 200 mesh material and that slightly more than 50% of the tailings material is plus 200 mesh. It has been determined that the under 200 mesh fines are easily segregated from the over 200 mesh using classifiers, preferably high volume cyclone classifiers. It has also been found that the most effective specific gravity separation using compound cyclones is accomplished with preclassified material, that is, material split at least into plus 200 mesh and minus 200 mesh splits before specific gravity separation.

Referring to the process flow diagram, the tails 10 are transported to a portable wash trough 12 by front-end loaders 14 and conveyed as a wet cake to a wash screen 16 for elimination of oversize material. A cleaned and screened slurry is drawn from the screen basin 18 and pumped to a classifying cyclone 20 with the over 200 mesh material from the underflow pumped to a high volume cyclone 22 for specific gravity separation of the plus 200 mesh material at a 3.5 cut to remove sulfides of iron, lead and zinc and other heavy metals before the plus 200 mesh material is fed to a slugger 24 to partially dewater before deposit of these sands to dry storage 26. The heavies from the plus 200 mesh material is ground in a bar mill 28 and returned to the wash basin for reclassification. Overflow from the screen basin and discharge water from the slugger are piped to a thickener or decanting pond 29. Settled material, which is well under 200 mesh, is periodically returned to the circuit line for minus 200 mesh material.

The minus 200 mesh overflow from the classifier 20 is pumped to a compound cyclone 30 for specific gravity separation at a 3.5 cut to extract silica, calcites and other light-weight minerals for delivery to a float cell 32 where any residual pyrite or other sulfide is floated from the fine gangue using a non-selective promotor such as AERO Xanthate 317. The sulfide float is fed to a low temperature rotary drier 34. The underflow silica and calcite from float cell 32 is fed to a second float cell 36 where calcite is separated from the remaining gangue, primarily silica, and dry stored 38 for use as a neutralizing agent, or, when calcinated, for use in lime production. The fine silicas are stored underwater preferably in a lined, or hydrogeological engineered pond 40 where any remaining sulfides ar eventually leached chemically or microbally. The silica store is useable in glass and cement production and dried only on an "as needed" basis. Any gold carried in the silicas can be separated in a flotation subcircuit using a metal selective promotor such as AEROFLOAT 208.

The underflow heavies from the cyclone 30 are fed to a second compound cyclone 42 for specific gravity separation at a 6.5 cut point to separate zinc sulfide and residual pyrite from lead sulfide, which are drawn from the underflow and delivered directly to the acid leach subcircuit 44. The overflow is delivered to a third float cell 46 to selectively extract residual pyrites from the zinc sulfide concentrate using a selective promoter and flotation agent. The zinc sulfide concentrate is fed as an underflow to the acid leach subcircuit. The floated pyrites join the pyrites from the parallel float circuit at the dryer 34 where water is removed in a $CO_2$ atmosphere before the dried pyrites are fed to a calciner 48. The various ore selection processes need not be highly efficient as both the pyrite circuit and the lead and zinc sulfide circuit are tolerant of cross material.

The calciner is a closed cycle system, preferably of fluid bed design, of the type manufactured by Dorr-Oliver as a Fluosolids ™ polymer and chemical drying system. The closed system calciner 48 is modified to include plate condensers for staged removal of sublimated elemental sulfur and any arsenic at "S" terminus (1). In the calciner, pyrite is transformed to pyrrhotite by the removal of one sulfur atom using thermal reduction by a heated, non-reacting gas such as CO2 at 1000° F. The hot pyrrhotite is delivered to a pressurized hydroclave 49 where the pyrrhotite is sparged with oxygen to oxidize the iron and release the remaining atom of sulfur as elemental sulfur. The iron is recovered and dry stored in an oxide pile 47. The elemental sulfur in the hydroclave coalesces into beads occluding resident impurities. The sulfur beads are removed at "S" terminus (2) for input to the sulfur refining circuit 50 together with the sulfur recovered from the calciner 48.

Any unreacted sulfides and residual gangue are delivered from the hydroclave to the acid leach circuit 44. The leach circuit may form elemental sulfur at "S" terminus (3) for input into the sulfur refining circuit 50.

Figure 2:
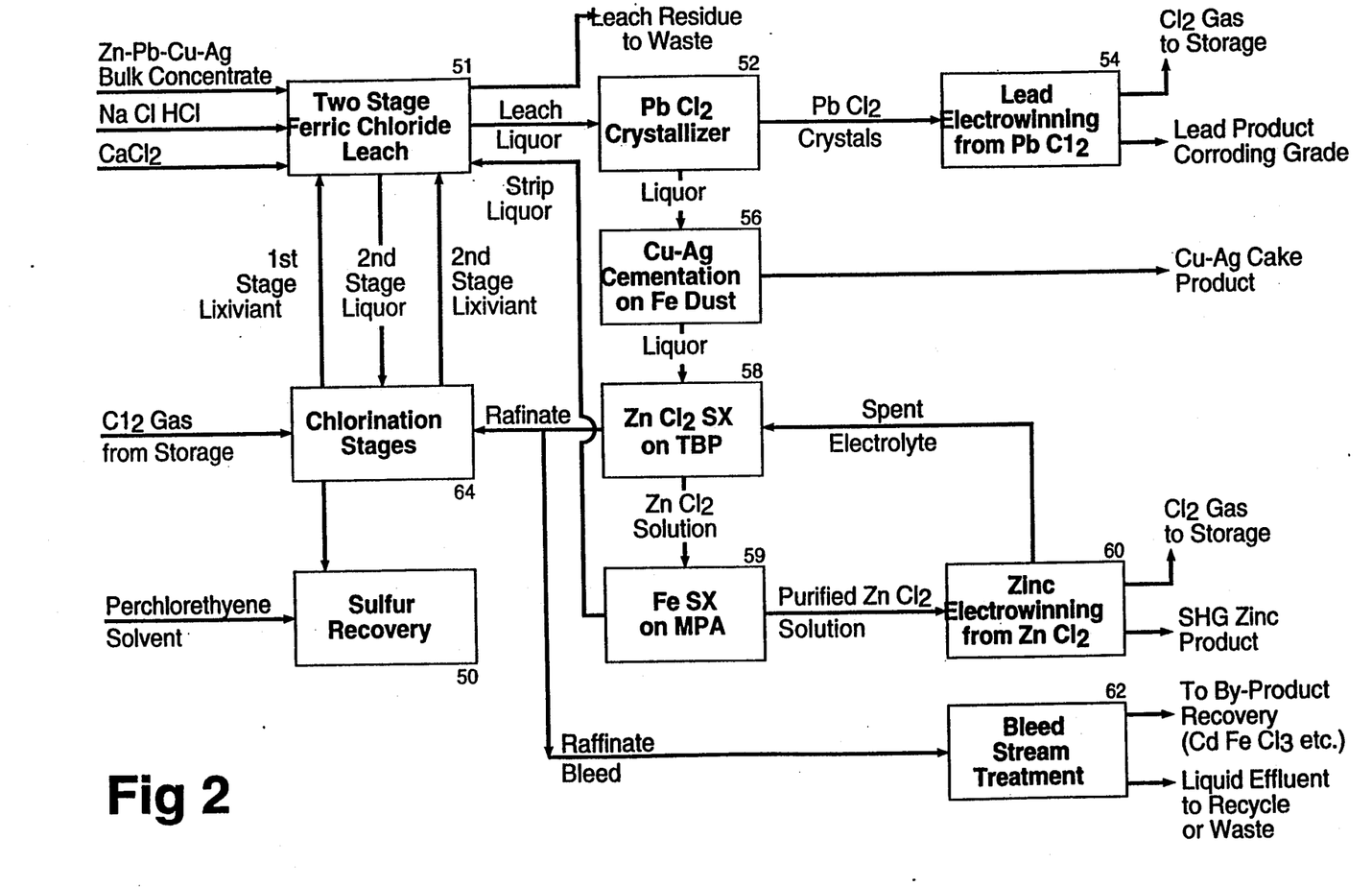
FIG. 2 is a block diagram of an acid leach circuit for recovery of metals.

The acid leach circuit 44 can be either a concentrated, heated sulfuric acid leach system of conventional design or alternate ferric chloride leach (FCL) circuit shown in the block diagram of FIG. 2. The FCL process is advantageous because it will accept a complex, copper, zinc and lead sulfide ore, allowing bulk floatation in the dressing phase of the refining circuit. Furthermore, the ore grade can be low, allowing use of the low grade tailings concentrate likely to be formed from poor quality tailing material. Finally, the contaminated elemental sulfur generated in the FCL process is ideally suited for purification by the sulfur refining circuit 50.

As shown in FIG. 2, bulk concentrate containing sulfides of copper, lead, zinc silver and residual iron, together with any heavy metals and mixed gangue are deposited into a first stage hydrochloric acid leach tank 51 at 108° C. The leach liquor is sent to a crystallizer 52 where lead chloride crystals are removed and used in an electrowinning circuit 54 for recovery of lead and chloride gas for reuse.

The partially spent liquor is delivered to a precipitator 56 where a copper-silver cake is precipitated using iron dust. The remaining liquor with zinc chloride and other impurities is delivered to a solvent extractor 58 where zinc chloride is removed and purified in a separator 59 to remove iron and sulfur. Zinc is electrolytically refined in cells 60 with chlorine gas recovered for reuse. Cadmium and iron as iron chloride are recovered in a bleed stream 62 to eliminate excess buildup in the raffinate circulation. The raffinate is recycled to the second stage leach tank 64 where chlorine is added to regenerate a strong leach liquor. Solids remaining after leach in the second stage leach tank are withdrawn and together with the elemental sulfur mixed therein is fed to the sulfur refining subcircuit for extraction. The ferric chloride leach circuit was developed by CANMET of Canada and is incorporated herein only as a preferred chemical leach circuit for recovered sulfide concentrate.

Figure 3:
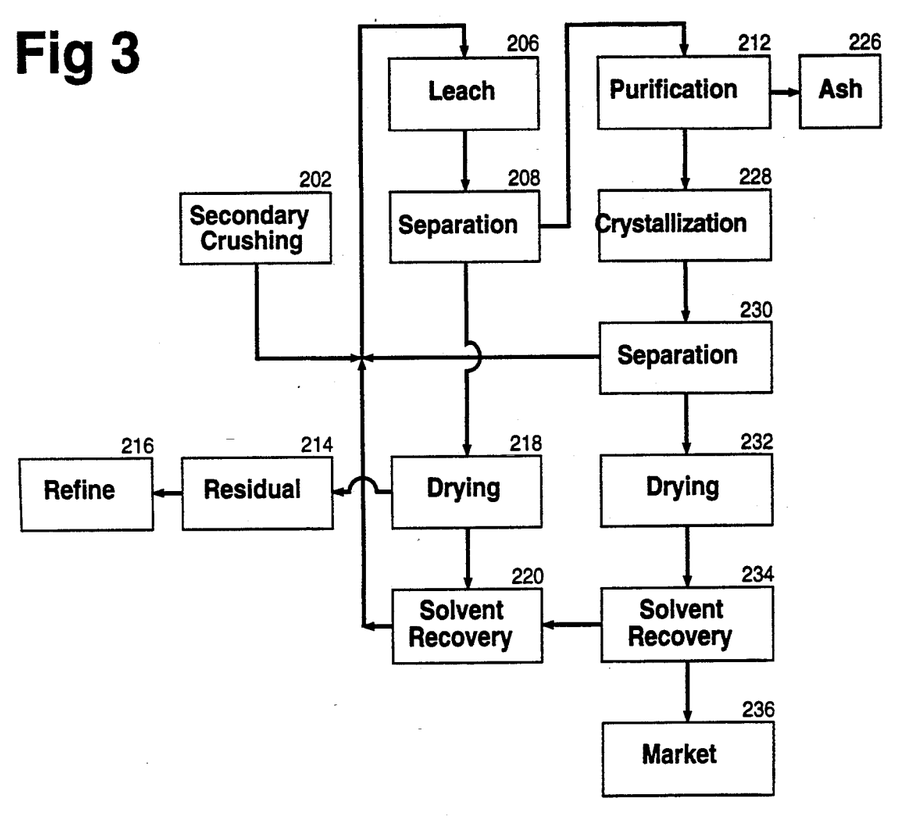
FIG. 3 is a block diagram of a recovery circuit for elemental sulfur.

The sulfur and residual gangue from the three "S" terminus points in the process flow diagram are combined and fed to a sulfur refining subcircuit FIG. 3.

The recovered sulfur from the three terminus points is likely to be agglomerated or in coalesced particles. After a secondary type crushing, 202, which requires little power because of the friable condition of the sulfur, the contaminated sulfur is immersed in a heated perchloroethylene solvent in a closed holoflite conveyor 208 where the elemental sulfur goes into solution and is separated by a centrifuge 208 from the remaining gangue. The gangue proceeds to a drying stage, where any solvent is recovered in a domed, heated holoflite conveyer 218 and condensed in a condenser 220 for return to the leach stage 206. The solvent liquor from separation 208 containing dissolved sulfur is filtered though a suitable filter 212 to remove any suspended particulate matter which is removed as an ash 226.

Still heated, the sulfur-solvent liquor is fed to a holoflite crystallizer 228 where the temperature of the liquor is gradually dropped to form crystals of sulfur. The crystals are separated by a centrifuge 230 and fed to a domed holoflite drier 232. Solvent is recovered and condensed in a condenser 234 and the dried crystal sulfur is discharged for marketing 236

At the gangue drier 218, dried gangue, which is now free of both zinc and sulfur, is finally amenable to a closed cyanide circuit 214 for extraction of gold in a refining circuit 216. Prior to this stage, sulfur and particularly zinc will intefer with cyanidation. The residue is preferably treated with ozone from an ozone generator to break down resident cyanide before the residue is discharged.

The discharge from this stream together with the discharge from the FCL subcircuit will contain the major toxins not previously collected in the calciner condensers. These materials are the primary candidates for geopolymer cementation or glass vitrification to bind the toxins into inert block. Alternately, the material with cadmium and arsenates removed is discharged to a receiving pond 45, can undergo a staged biological detoxification in the waste water treatment stream.

The wastewater treatment stream is primarily directed to recovery of metal sulfates which are either extracted by binding agents or transformed anaerobically back to sulfides, with metal sulfides recovered and returned to the chemical process and hydrogen sulfide transformed to elemental sulfur by a classic Claus reaction or by anaerobic and/or aerobically microorganisms as described in the following description.

The series of ponds 29, 40 and 45 that are included in the process flow diagram are biologically active and are designed to remove residual metal sulfides and oxides remaining after the primary chemical processing has occurred. As noted hereafter an alternate amine process may be employed for metal extraction. The amine process may either substitute for the biological leaching process or be used in conjunction with the biological leaching process, when used in conjunction it is preferably used before biological treatment. The ponds are preferably modular in construction, at least in early stages of treatment. Eventually the ponds discharge into a meandering stream for final natural clean-up of waters.

In general, sulfide tailings include various minerals such as silica, alumina, aluminosilicates and calcite found in common sands. With the exception of gold, the various recoverable metals of zinc, lead, copper and silver are not in metallic form, but in the sulfides, sphalerite, galena, chalcopyrite and argentite. Predominant among the sulfides is that of iron, called pyrite or fool's gold. When sulfides are exposed to air and the elements, they oxidized forming sulfate salts. These sulfate salts are able to dissolve in water and thus can migrate with the water. The transformation from sulfide to sulfate is accelerated a hundred fold by action of certain bacteria, primarily thiobaccilus ferrooxidans. Usually, some of the tailings material has already oxidized to sulfate with iron, at certain locations further oxidizing to iron oxide freeing sulfate for sulfuric acid for further metal leaching.

In the proposed process, sulfates washed from the tailings during ore dressing will be stored in solution in a primary lined sulfate pond 29 and the solution used to inoculate and transport the discharge streams from the chemical processing operations through the various biological processing stations.

In developing a concentrate of the fines for the described chemical refining using a water circuit, not all of the sulfides are recovered. A recovery of 90% is favorable. The 10% of sulfides remaining in the discharge material from the chemical circuit may comprise only a small fraction of the total original tailings, potentially less than one percent. However, even though only a trace of the sulfides remains it can be subjected to aggressive attack by microbes if the material is properly conditioned. Inhibiting attack is the mineral calcite or calcium carbonate. The oxidizing microbes prefer an acid environment and calcite will neutralize any sulfuric acid produced, forming calcium sulfate or common gypsum. Therefore, during the ore dressing operations, calcite is preferably removed by flotation and stored for use as a neutralization agent to be added to process waters for ph control after metals are removed and recovered.

A large quantity of material to be treated will be the discarded fine slime silicas that are separated from the recovered sulfides during concentration operations. These very fine slimes, after the removal of calcite, will be temporarily stored in shallow ponds 40 where the slimes are periodically immersed in aerated water preferably from underlying perforated water supply pipes. Waste heat in the exhaust gases from the power plant or glass works will maintain an optimum temperature for accelerated extraction. The stack gases from glass works or power plants can be finally scrubbed by spray waters to clean the gases and introduce heat and dissolved carbon dioxide into the spray water which is collected and added to the sulfate solution to beneficiate microbial action in the anaerobic chamber stages.

Arsenopyrite is preferentially attacked by thiobacillus ferrooxidons which frees arsenic as an arsenate. Arsenate is amenable to subsequent precipitation as a stable ferric arsenate which can be recovered and disposed. Any free barium will neutralize as barite. Silver, once considered immune to T. ferrooxidans, has been shown to be amenable to biological processing as is lead, zinc and iron which are transformed to their respective sulfate salts.

The sulfate solution, with or without further concentration as a brine by evaporation, will then be periodically drawn off the surface and together with extracted waters from the sulfate ponds, is channeled to an elongated, continuous anaerobic chamber. The chamber has internal baffles to allow for flow of the solution while entraining the second microbe, desulfovibrio desulfuricans, and/or desulfobacter postgateii. The anaerobic chamber is preferably supplied with flue gases to maintain optimum temperatures and provide the bacteria with a carbon source from the carbon dioxide in the gases. Additional nutrients are provided as needed from hydrocarbon wastes preferably from nearby sewer plants.

In the anaerobic chamber the metal sulfates are reduced to their original sulfides, which precipitate. Since the sulfate solution was separated from the undissolvable tailing gangue before being piped to the anaerobic chamber, the sulfides precipitated comprise a relatively high grade, but mixed concentrate.

The precipitated concentrate can be periodically withdrawn from the elongated chamber and recombined with the concentrate in the chemical operation. Discarded gangue from various stations in the chemical processing stages can be introduced to either an inoculated oxidizing pond or the reduction chamber depending whether the discard material is in a sulfide or sulfate form. The above described processes are extremely basic and will be the cornerstone of a more sophisticated program.

It has been discovered from studies of corrosion of underground steel pipe, that bacterial action can be enhanced by cathode action of a steel plate which makes hydrogen readily available to the reducing bacteria. By negatively charging the plate at low voltage some iron dissolved as iron sulfate is plated out of solution as metallic iron and iron hydroxide cement. Iron sulfide and hydrogen sulfide production is enhanced by the hydrolysis of water and the availability of iron hydrogen ions. Iron powder that is produced which is usable in the chemical process for cementation of silver and copper. This is one feature that is added to improve recovery.

Additionally, continuing the closed, baffled chamber, and providing the chamber with a clear top, a third type of bacteria, chlorobium limicola forma thiosulfatophilum, a photoautotrophic, algae-like bacteria can be cultivated. This bacteria will extract hydrogen sulfide from solution and precipitate elemental sulfur. Finally, any remaining hydrogen sulfide can be transformed to elemental sulfur in a final collection pond by the bacteria, beggiatoa, a semi-aerobic bacteria that employs hydrogen sulfide in a metabolic reaction at the anaerobic/aerobic interface zone. From this final pond, water is perged of any remaining metal ions and neutralized with calcite, precipitating any residual sulfate ions as gypsum. The water is then released to staged organic polishing ponds stocked with algae, hyacinth, and in later stages, koi to demonstrate the relative purity of the water before release to the on-site wetland or waterway. Portions of the algae and hyacinth are periodically removed, and combusted to recover any escaped metals that appear as oxides contained in the ash. Alternately, the biomass is shredded and fed to the anaerobic bacteria as a hydrocarbon stock.

Figures 4, 5, 6:
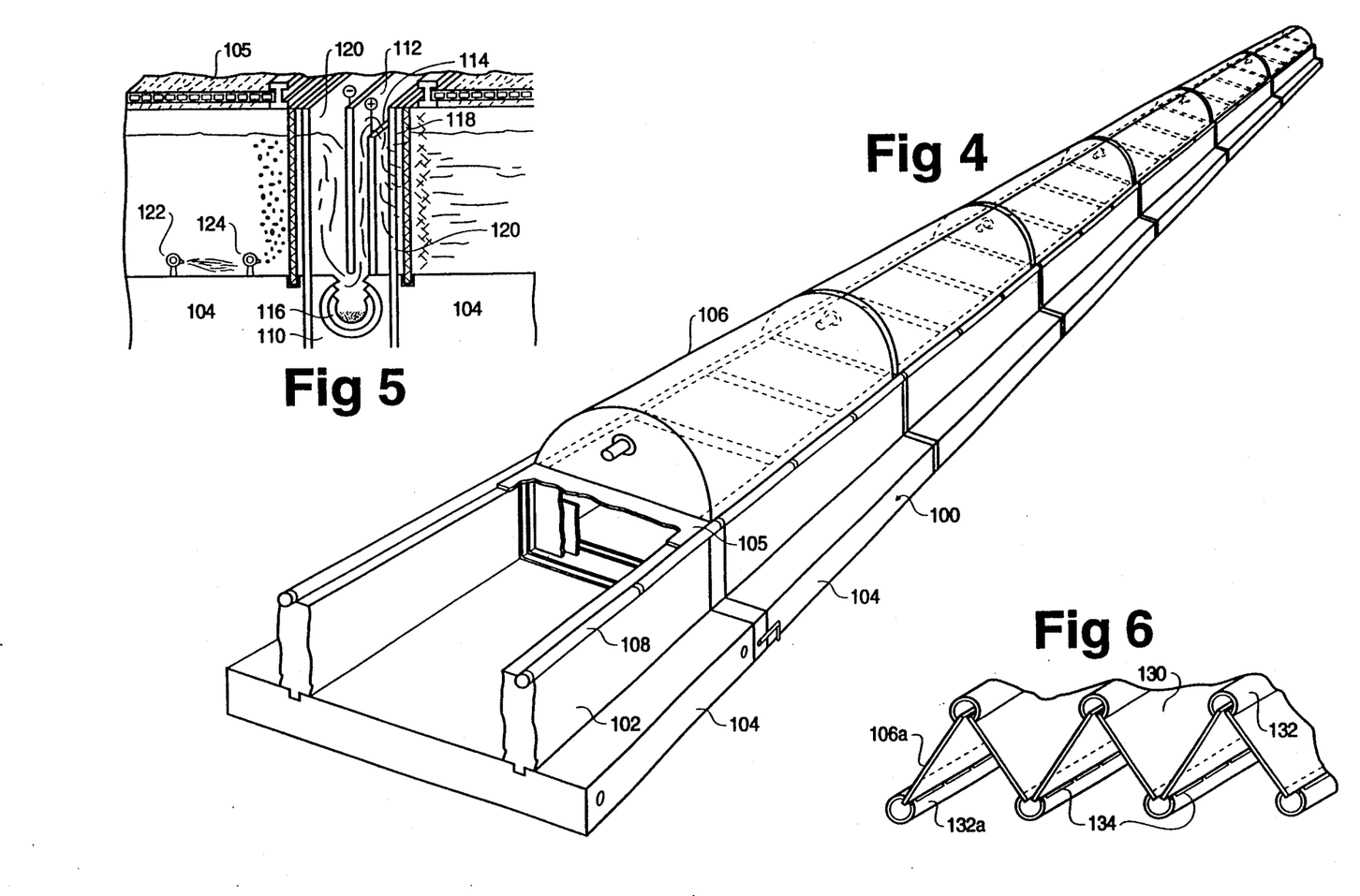
FIG. 4 is a perspective view of a biological leach system partially broken away for recovery of metal sulfides and elemental sulfur.
FIG. 5 is a partial cross sectional view of a segment of the leach system of FIG. 4.
FIG. 6 is a perspective view of an alternate cover system for the biological leach system.

Preliminary designs of the chamber system 100 as shown in FIG. 4 utilize a modular concept. Under consideration are 10 foot wide channels 102, 3-4 feet deep, in 10-20 foot sections to take advantage of modular fabrication and standard size materials. The channels 102 will be formed of cast segments 104 from tailing sands with segments sealed and interconnected by tension rods. Clear plastic, honey-comb, panels 105 or domed plastic sheets 106 cover sections requiring light exposure. Inexpensive plastic pipe 108 will provide circulation of gases and waters. The design will enable removal and reassembly at another site once decontamination complete.

As shown in the cross section detail of FIG. 5, between adjacent chamber segments 104 is a baffle assembly 110 with an underflow baffle 112 and an overflow baffle 114 such that water is directed under the underflow baffle 112 and between the two baffles to pass over the overflow baffle 114 before passing to the next serial chamber segment. Preferably, in initial stages of the chamber system the baffles are electrically charged with the underflow baffle being cathodic for collection of metals and metallic cements which may periodically sluff or be scraped to a rotatable recovery tube 116 for removal. Any hydrogen generated at the cathode is used by bacteria in the reduction process for the formation of hydrogen sulfide. Further, the anode 114 provides for the destruction of any cyanide compounds formed in circuits where gold recovery is effected by cyanidation.

The chamber segments 104 are separated by a screen or fibre filter 118 and a membrane filter 120 of pore size to inhibit migration of bacteria when desired, for example between anaerobic and aerobic chamber sections. As shown in FIG. 5, water jets 122 can be employed to add water, with or without nutrients to the lower confines at the chamber and move sediments to the collection tube in stages where at least one set of filters are removed. Gas jets 124 can also be employed to add gases, such as $CO_2$ to the water to promote bacteria growth.

The alternate top cover 106 as shown in FIG. 6 includes sloped panes of clear glass 130 mounted in plastic slit pipe 132 with the bottom pipe 132a having slots 134 for collection of condensed water that runs down the inside of the panes. This condensate, of relative purity can be collected for use in processing or watering.

The chamber system is an adjunct to a natural stream system that receives the eventual discharge from the chamber system. The final segment or segments of the chamber system include a water purification medium that extracts metal ions. A preferred medium is BIO-FIX BEADS, a high density polysulfone dissolved into dimethylfonmamide (DMF) blended with dried dead biomass materials, injected into water and cured, as developed by the U.S. Bureau of Mines. The beads are periodically removed and the collected metals stripped with dilute sulfuric acid, regenerating the beads for further use.

As contaminants decrease, all but these last segments of chamber with the water purification medium can be removed. When this last station is removed the remediation is essentially complete.

Key to the successful remediation of a site is appropriate hydrogeological engineering such that process waters are drawn from wells strategically located to interrupt migration of underground contaminants. As the site is rehabilitated, the sands are redeposited in a manner that permits collection of water percolated down through the sands by sprinkler systems. Impermeable barriers formed of cementicious, clay or man-made materials are installed as necessary to protect underlying aquifers and enhance collection of percolated waters by appropriate sloping and contouring to direct underground flow of leaching waters to the extraction wells.

Similarly, the separated slimes are deposited in a manner that contamination of underlying aquifers is inhibited by leaching waters. Water is injected under the slimes, preferably in perforated horizontal pipes to percolate upward to the surface where a sulfate containing runoff can be collected.

As an adjunct to bioremediation by the use of water innoculated with sulfide oxidizing bacteria, a chemical leaching can be first performed. In this process, ethylenediaminetetracetic acid (EDTA) is used as a chelating agent. Water containing EDTA and added ammonia in a water solution is sprayed over the tailing sands, or in the case of the fines, injected under the fines. The EDTA solution selectively sequesters the metals into solution and is collected in wells or as runoff for discharge into evaporation ponds to concentrate the contaminants and active ingredients for recovery in the manner described with reference to FIGS. 7 and 8.

Figure 7:
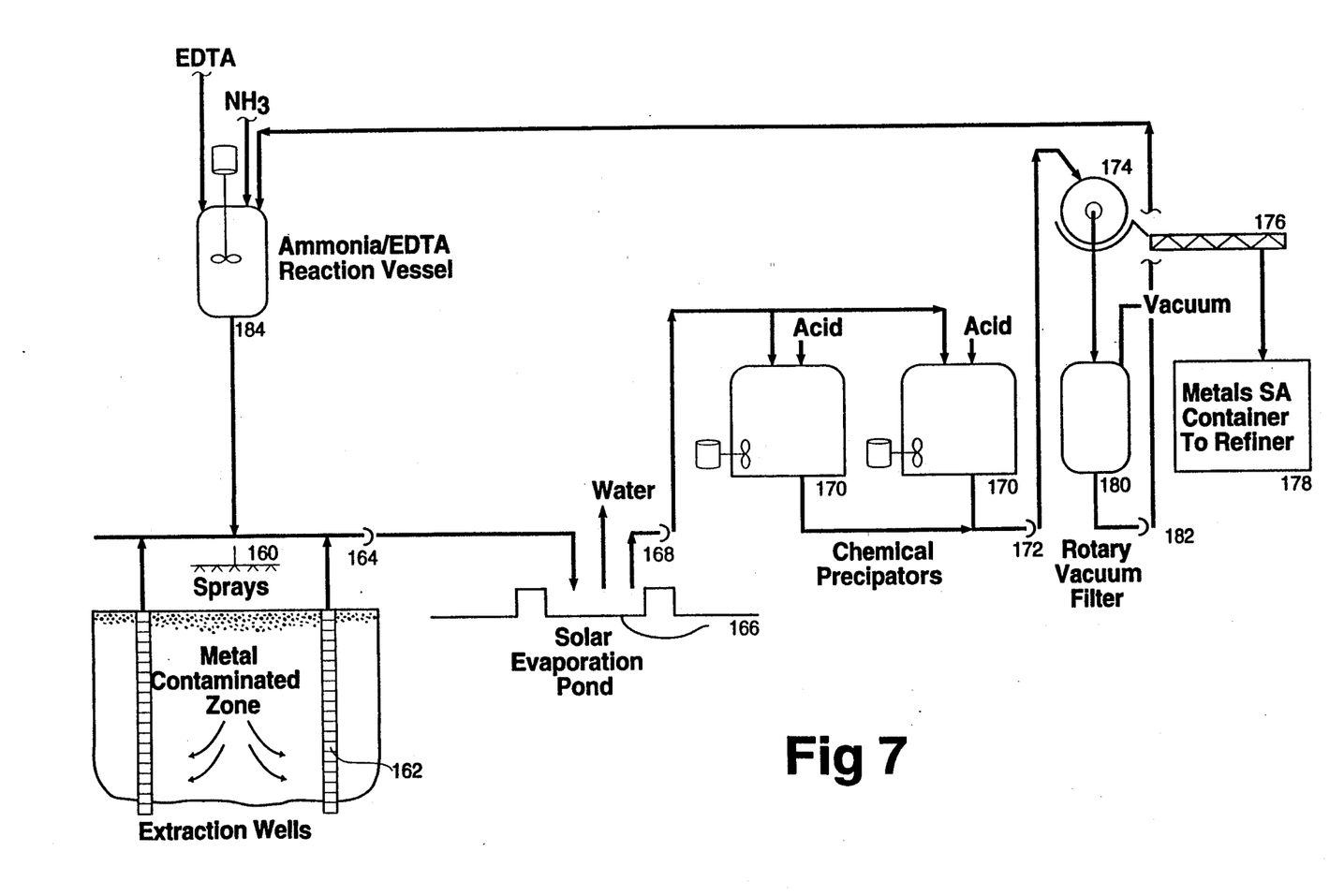
FIG. 7 is a schematic diagram of a chelating circuit for metal salt recovery.
Figure 8:
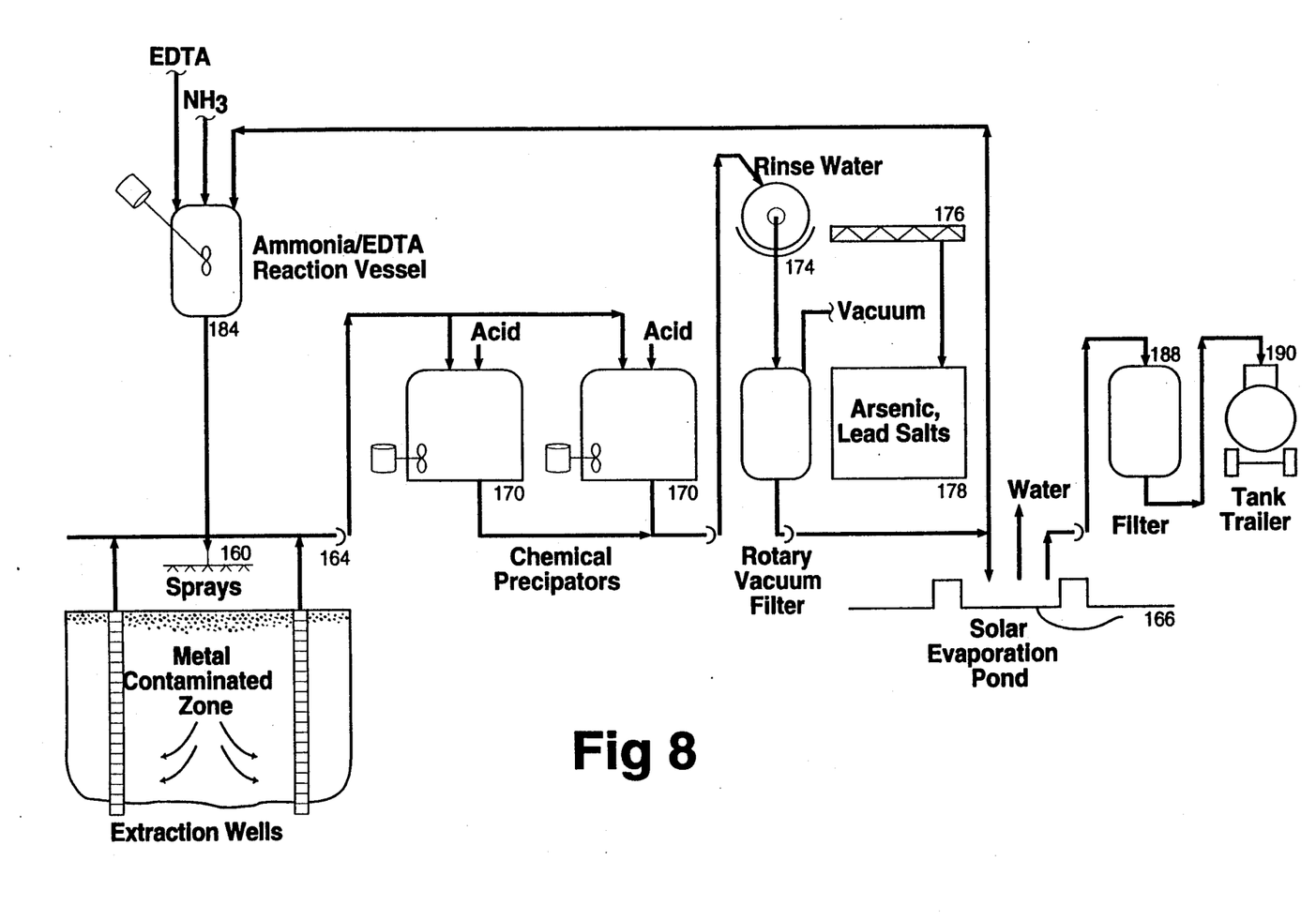
FIG. 8 is a schematic diagram of chelating circuit for micronutrient recovery.

Referring to FIGS. 7 and 8, there are certain sites that do not warrant reprocessing the tailings to recover a concentrate either because the values recoverable do not warrant the capital expense or the contamination level is relatively low and does not warrant major disturbance of the ground.

In the schematic of FIG. 7, sprinklers 160 spray water containing EDTA and ammonia over the ground to be treated. The solution percolates down through the ground leaching metals from the sulfides. Displaced and oxidized sulfides form benign ammonium sulfates, a soil beneficiate. Hydrogeologically engineered extraction wells 162 with pumps 164 recover the spray solution together with any inflowing ground water. The extracted solution is discharged to an evaporation pond 166 for concentration of the recoverable contaminants and chelating agent. The concentrate is pumped by a pump 168 to one of two batch precipitators 170 where acid, preferably sulfuric, is added to adjust pH and precipitate metal salts. The salt slurry is recovered as an underflow and pumped by a pump 172 rotary drum filter 174 where the salt cake is discharged by a screwconveyer 176 to a collection bin 178. The chelating solution drawn by a vacuum 180 from the filter 174 is pumped by a pump 182 to a mixer 184 where makeup EDTA is added and reacted with ammonia to form the elute solution supplied to the sprayers 160.

In the alternate circuit of FIG. 8, the chemical precipitators 170 have a closely controlled pH to selectively precipitate contaminants such as arsenic and lead salts, with the recovery of micronutrients as a concentrate chelate solution containing beneficial metal derivatives of zinc, manganese, copper and iron. Concentration of a bleed stream is accomplished in a solar pond 166 after the selective precipitation of toxics. The concentrated chelate solution is filtered by a filter 188 and delivered to a tank trailer 190. Arsenic and lead salts are collected for sale or safe disposal.

Since the active ingredient in the chemical leaching circuit, EDTA is benign and in fact is used in humans to induce discharge of excess and other metals in body, the site can be placed in relatively immediate use if compatible with the long term leaching process. For example, the site can be constructed into a golf course with leaching accomplished by fairway and greens sprinklers with the leaching agent added to the water. Alternately, metal tainted soils can be used for non-consumable plant production such as flower propagation. In all plans shallow wells draw water for on site use such that surrounding aquifer waters are drawn toward the wells reversing the direction of contaminant migration.

As the recovery diminishes to the point costs of the chemical additives are excessive, bioleaching can be substituted for chemical leaching with the spray water innoculated with benign sulfate oxidizing bacteria.

As differentiated from most site remediation systems, leaching is encouraged rather than inhibited. Using the dual tools of chemical followed by biological leaching, a cost effective decontamination and recovery system can be devised whether insitu or as an entrained process.

In each case, the hydrogeology of the site is extremely important as the strategic location of extraction wells and the deliberate percolation of sprayed water is important to the efficiency of the system. Gradually, as the recovery of metals diminishes, the quantities of spray waters can be lowered, innoculation of spray waters with chelating agents or bacteria can be stopped and metal ion filtration systems removed. When monitoring of upstream plant systems indicates no further uptake of contaminants, the active water cycling can either be continued according to need, or finally halted with trace rehabilitations continued by natural systems of rain and runoff. The methods defined herein are directed to designing with nature such that problem sites are truly rehabilitated.

What is claimed is:

1. A method for remediation of sites on which are deposited mine tailings having metals and metal compounds with a substantial proportion of the tailing comprising complex sulfide tailings comprising the steps:
   (a) separating sands and slimes from larger materials;
   (b) separating sands from slimes;
   (c) depositing slimes at a site location suitable for immersing slimes in water with means for drawing water from the top surface of the slimes;
   (d) depositing sands at a site location with means for extracting percolated water from under the sands;
   (e) spraying the surface of the sands with a water solution having a leaching agent wherein the sands have metals and metal compounds that are contacted by the water solution having the leaching agent;
   (f) injecting the slimes with a water solution having a leaching agent, wherein the slimes have metals and metal compounds that are contacted by the water solution having leaching agent;
   (g) draining water with leached metal compounds from under the sands;
   (h) drawing water with leached metal compounds from the top surface of the slimes; and
   (i) recovering metal compounds from the water drawn from the sand and slimes.

2. The method of claim 1 wherein the leaching agent is a chelating agent.

3. The method of claim 2 wherein the chelating agent is ethylenediamine tetraacetic acid.

4. The method of claim 3 wherein the leaching agent is combined with an ammonia activator.

5. The method of claim 1 wherein the leaching agent is a sulfide oxidizing bacteria.

6. The method of claim 5 wherein the oxidizing bacteria is sulfolobus acidocaldarius.

7. The method of claim 5 wherein the sulfide oxidizing bacteria forms metal sulfate compounds and the step of recovering metal compounds includes reducing metal sulfates in a water solution using a sulfur reducing bacteria.

8. The method of claim 7 including the step of recovering elemental sulfur in a water solution using a sulfide oxidizing bacteria that generates elemental sulfur.

9. The method of claim 8 wherein the sulfide oxidizing bacteria is beggiatoa.

10. The method of claim 7 wherein the reduction of metal sulfates includes the use of a cathode for hydrogen ion production.

11. The method of claim 7 wherein the sulfur reducing bacteria is desulphovibrio desulphuricans.

12. The method of claim 5 wherein the oxidizing bacteria is Thiobacillus ferrooxidans.

13. A method of in situ remediation of sites having zones contaminated with metals and metal compounds having a composition including metal oxides and metal sulfides comprising the steps of:
   (a) installing hydrogeologically engineered extraction wells, under zones contaminated with metals and metal compounds;
   (b) sprinkling the site with water containing a benign chelating agent wherein the water and chelating agent percolate through the zones;
   (c) contacting the metal oxides and metal sulfides in the zones with water containing the chelating agent;
   (d) extracting water from the extraction wells;
   (e) recovering metal salt compounds from the water containing the chelating agent; and
   (f) recycling the water containing the chelating agent to the sprinkling step.

14. The method of claim 13 wherein the chelating agent is ethylenediamine tetriacetic acid.

15. The method of claim 14 including an ammonia activator.

16. The method of claim 13 wherein the step of recovering metal salt compounds includes the steps of:
   evaporating extracted water from the extraction wells to concentrate the metal compounds and chelating agent;
   separating precipitated metal salt compounds from the water and concentrated chelating agent before recycling the water containing the chelating agent to the sprinkling step.

17. The method of claim 13 wherein the step of recovering metal salt compounds includes the steps of:
   precipitating select toxic metal salt compounds in the extracted water from the extraction wells in a precipitator;
   diverting a portion of the extracted water after select precipitation to an evaporator;
   evaporating water from the diverted water to concentrate chelated metal compounds in a concentrated solution of chelated metal compounds beneficial as a micronutrient,
   filtering the concentrated solution;
   storing the filtered concentrated solution for use as a micronutrient.

18. The method of claim 13 wherein the chelating leaching process is followed by bioleaching with a sulfur oxidizing bacteria, and extracting remaining metal ions in a bed of polysulfone beads.

19. The method of remediating a site having complex sulfide tailings with recoverable mineral and metal values comprising:
   (a) classifying tailings according to multiple size fractions.
   (b) specific gravity separation of select size fractions to recover a concentrates of heavier material including a predominance of metals and compounds and a discharge of lighter material including remaining metals and metal compounds in predominately silicas and calcites;
   (c) separating calcites from the discharge of lighter material for storage;
   (d) selectively depositing the lighter material on site in a manner that enhances leachability;
   (e) circulating water having leaching agent through the deposited lighter material; and
   (f) extracting mineral and metal values form the circulation water; and (g) using separated calcites for neutralization of circulation water.

20. The method of claim 19 wherein the lighter material deposited on site is subjected to the step of leaching with a leaching agent to recover metals and metal compounds.

21. The method of claim 19 wherein the metal concentrates contain pyrite that are convertible to pyrrhotite and are subjected the steps of heat treating in a closed cycle fluid bed calciner with a non-reacting gas to transform pyrite to pyrrhotite;

and oxidizing remaining sulfides and pyrrhotite in a hydroclave sparged with oxygen.

22. The method of claim 21 wherein the oxidized metals are selectively precipitated in an added step of acid leaching.

23. The method of claim 22 with the added step of recovering and refining any elemental sulfur generated in the processing steps.

* * * * *